United States Patent
Coulmeau et al.

(10) Patent No.: US 9,494,945 B2
(45) Date of Patent: Nov. 15, 2016

(54) FLIGHT MANAGEMENT DEVICE FOR AN AIRCRAFT ADAPTED TO THE HANDLING OF MULTIPLE TIME CONSTRAINTS AND CORRESPONDING METHOD

(71) Applicant: THALES, Neuilly-sur-Seine (FR)

(72) Inventors: Francois Coulmeau, Seilh (FR); Guy Deker, Cugnaux (FR); Xavier Blanchon, Toulouse (FR); Patrick Mazoyer, Saint-Leon (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 13/900,215

(22) Filed: May 22, 2013

(65) Prior Publication Data

US 2013/0317739 A1  Nov. 28, 2013

(30) Foreign Application Priority Data

May 25, 2012  (FR) ..................................... 12 01500

(51) Int. Cl.
G05D 1/10 (2006.01)
G08G 5/00 (2006.01)

(52) U.S. Cl.
CPC ............ G05D 1/101 (2013.01); G08G 5/0039 (2013.01)

(58) Field of Classification Search
CPC ............ G08G 5/0039; G08G 5/0052; G05D 1/0038; G05D 1/0088; B64C 19/00
See application file for complete search history.

(56) References Cited

U.S. PATENT DOCUMENTS

| | | | | |
|---|---|---|---|---|
| 6,542,796 B1* | 4/2003 | Gibbs | .................. | G01C 23/005 244/183 |
| 7,765,061 B1* | 7/2010 | Barber | .................. | G01C 23/00 701/436 |
| 7,787,999 B1* | 8/2010 | Barber | ................ | G01C 23/005 340/988 |
| 8,099,201 B1* | 1/2012 | Barber et al. | ..................... | 701/4 |
| 8,332,145 B2 | 12/2012 | Dacre-Wright et al. | | |
| 8,340,843 B2 | 12/2012 | Coulmeau et al. | | |
| 9,043,051 B1* | 5/2015 | Barber | .................... | B64C 19/00 701/11 |
| 2009/0112454 A1* | 4/2009 | Wachenheim et al. | ........ | 701/121 |
| 2010/0042268 A1* | 2/2010 | Arnold | .................. | G06Q 50/30 701/3 |
| 2010/0114407 A1* | 5/2010 | Klooster et al. | .................. | 701/3 |
| 2010/0131125 A1 | 5/2010 | Blanchon et al. | | |
| 2010/0217459 A1* | 8/2010 | Caillaud et al. | .................. | 701/3 |
| 2010/0217510 A1 | 8/2010 | Deker | | |
| 2011/0137493 A1* | 6/2011 | Dacre-Wright et al. | .......... | 701/3 |
| 2011/0196564 A1* | 8/2011 | Coulmeau | ....................... | 701/26 |
| 2011/0208376 A1* | 8/2011 | Mere et al. | ..................... | 701/14 |
| 2014/0156114 A1* | 6/2014 | Aymeric | ............... | G01C 23/00 701/3 |

FOREIGN PATENT DOCUMENTS

| | | |
|---|---|---|
| FR | 2942566 A1 | 2/2009 |
| FR | 2921151 A1 | 3/2009 |
| FR | 2938327 A1 | 5/2010 |
| FR | 2938939 A1 | 5/2010 |
| FR | 2942328 A1 | 8/2010 |
| FR | 2946161 A1 | 12/2010 |
| WO | 02/031796 A2 | 4/2002 |

* cited by examiner

Primary Examiner — John R Olszewski
Assistant Examiner — Nicholas K Wiltey
(74) Attorney, Agent, or Firm — Baker & Hostetler LLP

(57) ABSTRACT

A device and method for flight management of an aircraft along a flight plan comprises a plurality of waypoints comprising a computation of the temporal predictions determining the temporal situation of the aircraft for each waypoint of the flight plan, a temporal situation of the aircraft being defined by at least one set of information from among the group comprising the target time of transit at each waypoint the estimated minimum and maximum times of arrival at each waypoint, the estimated time of transit at the waypoint, and a formatting and display simultaneously presenting the temporal situations of the said plurality of waypoints.

9 Claims, 5 Drawing Sheets

| | RTA FEASIBILITY 1/2 | | |
|---|---|---|---|
| | ETAmin | ETA | ETAmax |
| KOVAS | 1428 48 | 1433 00 | 1437 51 |
| UM732 | 146° | 38.0 NM | |
| CAR | 1433 52 | 1438 26 | 1443 42 |
| M871 | 108° | 59 NM | |
| ADAMI | 1441 44 | 1446 51 | 1452 46 |
| | 108° | 59 NM | |
| KAPIL | 1449 36 | 1455 17 | 1501 51 |
| | 110° | 53 NM | |
| PAR | 1456 40 | 1502 51 | 1510 00 |
| < RETURN | | | ETA REF > |

WPT1, WPT2, WPT3, WPT4, WPT5

FIG.5A

| | RTA EDIT 2/2 | | |
|---|---|---|---|
| | RTAinf | ETA | RTAsup |
| KOVAS | | 1433 00 | |
| UM732 | 146° | 38.0 NM | |
| CAR | 1438 00 | 1438 26 | 1440 00 |
| M871 | 108° | 59 NM | |
| ADAMI | | 1446 51 | |
| | 108° | 59 NM | |
| KAPIL | 1448 00 | 1455 17 | |
| | 110° | 53 NM | |
| PAR | 1503 00 | *1502 51 | 1503 00 |
| < RETURN | | | ETA REF > |

FIG.5B

FLIGHT MANAGEMENT DEVICE FOR AN AIRCRAFT ADAPTED TO THE HANDLING OF MULTIPLE TIME CONSTRAINTS AND CORRESPONDING METHOD

CROSS-REFERENCE TO RELATED APPLICATION

This application claims priority to foreign French patent application No. FR 1201500, filed on May 25, 2012, the disclosure of which is incorporated by reference in its entirety.

FIELD OF THE INVENTION

The present invention relates to onboard systems for aiding navigation such as onboard electronic libraries, commonly designated by the initials EFB corresponding to the conventional terminology "Electronic Flight Bag", or flight management systems of aircraft, commonly designated by the initials "FMS" corresponding to the conventional terminology "Flight Management System", or mission preparation systems. It applies more particularly to devices for displaying flight plans, and relates to the management of multiple time constraints.

BACKGROUND

Typically, air traffic control bodies can require aircraft to pass given points of the airspace at given times, or RTAs according to the initials of the expression "Requested Time of Arrival" for a planned time constraint or CTA, according to the initials of the expression "Controlled Time of Arrival" for a time constraint activated by the air traffic controller. Hereinafter, these two types of constraints will be designated RTA without distinction.

During flight preparation or during rerouting, the crew input various items of information relating to the progress of the flight, typically by using an aircraft's flight management device, commonly designated by the acronym FMS, corresponding to the expression "Flight Management System". An FMS comprises input means and display means, as well as computation means, and an operator, for example the pilot or the copilot, can input via the input means information such as RTAs, associated with waypoints, that is to say points vertically in line with which the aircraft must pass.

The computation means make it possible notably to compute, on the basis of the defined flight plan, that is to say on the basis of the list of waypoints, the trajectory of the aircraft, as a function of the geometry between the waypoints and/or the altitude and speed conditions, used notably for computing the turning radii. Over the lateral trajectory thus determined, the computation means are also configured to optimize a vertical trajectory, employing possible altitude, speed and time constraints.

The input of the information, and the display of the information which is input or computed by the display means, constitute a man-machine interface or "MMI".

With known devices of FMS type, when the operator inputs a waypoint, he does so via a dedicated display displayed by the display means. This display may optionally also display information relating to the temporal situation of the aircraft in relation to the waypoint considered. The operator can then input and view a time constraint imposed for this waypoint. An example display of the information relating to a waypoint, in a device known from the prior art, is illustrated by FIG. 2, described in detail hereinafter.

However, flights may involve multiple RTAs, that is to say several waypoints may be associated with various time constraints. With the known devices of FMS type, the management of constraints of multiple RTA type is tricky or indeed impossible: though it is sometimes possible to insert several time constraints into a flight plan, the operator can input and view the information relating to a single waypoint, and must request the display of various screens to view and input, if appropriate, the information specific to as many different waypoints. Modifications made to the constraints relating to a given waypoint do not impact the temporal situations specific to the other waypoints of the flight plan, and it is necessary for the pilot to indulge in irksome and protracted gymnastics by manually swapping the display of the various screens specific to the various waypoints of the flight plan considered, and by determining, mentally or with the aid of remote computation devices, what may be the implications of modifications to constraints on a given waypoint, in relation to the other waypoints of the flight plan.

SUMMARY OF THE INVENTION

An aim of the present invention is to alleviate at least the aforementioned drawbacks, by proposing a flight management device, as well as a method associated therewith, ensuring effective and intuitive management of multiple time constraints related to a flight plan.

For this purpose, the subject of the invention is a flight management device for an aircraft, comprising:
  at least display means for displaying information relating to a flight plan defined by at least one plurality of waypoints, and for example characteristics of routes such as the distance, the name of the route or procedure, the angle of route between successive points,
  computational means,
  input means for entering temporal flight constraints and data by an operator,
wherein a temporal situation of the aircraft being defined by at least one set of information from among the group comprising the target time of transit at each waypoint, the estimated minimum and maximum times, determined by the computation means, of arrival at each waypoint, the minimum and/or maximum time constraints at each waypoint having a time constraint such as input into the flight plan, the estimated time of transit, determined by the computation means, at each waypoint, the input means are adapted for selecting and modifying the parameters of the time constraints relating to a waypoint, the computational means being configured to determine the temporal situation relating to the other waypoints as a consequence of the modification, the display means being configured to simultaneously display the set of temporal situations of the aircraft in relation to a plurality of waypoints.

In one embodiment of the invention, the display means can be configured to present the aircraft's temporal situations relating to the waypoints of the flight plan on a plurality of timelines, each timeline comprising a particularization of at least the estimated time of transit of the aircraft and the estimated minimum and maximum times of arrival at the corresponding waypoint.

In one embodiment of the invention, the display means can be configured to particularize an active or inactive character of a time constraint, a time constraint being active if the flight of the aircraft is slaved to this time constraint.

In one embodiment of the invention, the input means for entering flight data can be configured to allow the simultaneous modification or display of one or more time constraints of one or more chosen waypoints.

In one embodiment of the invention, a time constraint associated with a waypoint is included in the group comprising a time constraint of "AT" type according to which the aircraft must reach the waypoint at a determined instant, a time constraint of "AT OR BEFORE" type according to which the aircraft must reach the waypoint up to a determined instant, a time constraint of "AT OR AFTER" type according to which the aircraft must reach the waypoint onwards of a determined instant, and a time constraint of "WINDOW" type according to which the aircraft must reach the waypoint during a time window included between two determined instants.

In one embodiment of the invention, the input means can be configured to allow the selection of a strategy for convergence of the aircraft's flight predictions to one or more time constraints, a strategy comprising at least the choice of the consideration of the various time constraints and the order of consideration of the time constraints along the flight plan.

The subject of the present invention is also a method of flight management of an aircraft along a flight plan comprising a plurality of waypoints comprising the steps consisting in: computing the temporal predictions determining the temporal situation of the aircraft for each waypoint of the flight plan,
a temporal situation of the aircraft being defined by at least one set of information from among the group comprising the target time of transit at each waypoint, the estimated minimum and maximum times of arrival at each waypoint, the minimum and/or maximum time constraints at each waypoint having a time constraint such as input into the flight plan, the estimated time of transit at the waypoint, formatting and displaying s simultaneously the set of temporal situations in relation to a plurality of waypoints, selecting and modifying parameters of the time constraints relating to a waypoint, returning to the step of computing the temporal predictions determining the temporal situation of the aircraft for each waypoint.

In one embodiment of the invention, the formatting and displaying step can present the aircraft's temporal situations relating to the waypoints of the flight plan on a plurality of timelines, each timeline comprising a particularization of at least the estimated time of transit of the aircraft and the estimated minimum and maximum times of arrival at the corresponding waypoint.

In one embodiment of the invention, the formatting and displaying step can particularize an active or inactive character of a time constraint, a time constraint being active if the flight of the aircraft is slaved to this time constraint.

In one embodiment of the invention, the method of flight management can furthermore comprise a step of modifying a parameter allowing the modification of a target time of a chosen waypoint associated with a time constraint.

In one embodiment of the invention, a time constraint associated with a waypoint can be included in the group comprising a time constraint of "AT" type according to which the aircraft must reach the waypoint at a determined instant, a time constraint of "AT OR BEFORE" type according to which the aircraft must reach the waypoint up to a determined instant, a time constraint of "AT OR AFTER" type according to which the aircraft must reach the waypoint onwards of a determined instant, and a time constraint of "WINDOW" type according to which the aircraft must reach the waypoint during a time window included between two determined instants.

In one embodiment of the invention, the method of flight management can furthermore comprise a prior step of defining the strategies allowing the selection of a strategy for convergence of the flight of the aircraft to a time constraint, a strategy comprising at least the choice of the consideration of the various time constraints and the order of consideration of the time constraints along the flight plan.

BRIEF DESCRIPTION OF THE DRAWINGS

Other characteristics and advantages of the invention will become apparent on reading the description, given by way of example, offered with regard to the appended drawings which represent.

DETAILED DESCRIPTION

Figure 1:
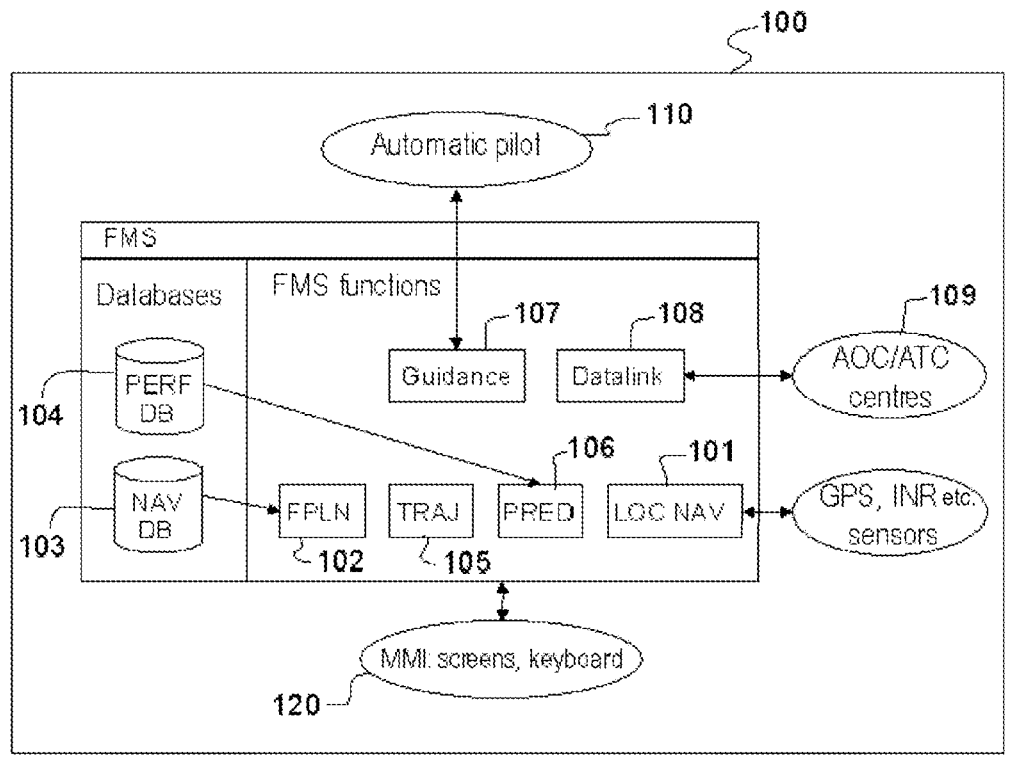
FIG. 1, by a schematic, the structure of a flight management system of FMS type, known from the prior art, FIG. 2, an exemplary display of information relating to a waypoint, by a device of known FMS type, FIG. 3, a logic diagram illustrating a method of flight management, in an exemplary embodiment of the present invention, FIGS. 4A and 4B, examples of display of information relating to a plurality of waypoints, according to an exemplary embodiment of the invention, FIGS. 5A and 5B, examples of display of information relating to a plurality of waypoints, according to another exemplary embodiment of the invention.

FIG. 1 presents, by a schematic, the structure of an onboard flight management system of FMS type, known from the prior art. A system of FMS type 100 has a man-machine interface 120 comprising input means, for example formed by a keyboard, and display means, for example formed by a display screen, or quite simply a touch display screen, as well as at least the following functions, described in the ARINC 702 standard, "Advanced Flight Management Computer System", of December 1996:

Navigation (LOCNAV) 101, for performing optimal location of the aircraft as a function of the geo-location means 130 such as satellite geo-positioning or GPS, GALILEO, VHF radionavigation beacons, inertial platforms. This module communicates with the aforementioned geo-location devices;

Flight plan (FPLN) 102, for inputting the geographical elements constituting the skeleton of the route to be followed, such as the points imposed by the departure and arrival procedures, the waypoints, the aerial corridors commonly designated "airways" according to the conventional terminology;

Navigation database (NAVDB) 103, for constructing geographical routes and procedures with the help of data included in the bases relating to the points, beacons, interception or altitude legs, etc.;

Performance database (PERFDB) 104, containing the craft's aerodynamic and engine parameters;

Lateral trajectory (TRAJ) 105, for constructing a continuous trajectory on the basis of the points of the flight plan, complying with the performance of the aircraft and the confinement constraints (RNP);

Predictions (PRED) 106, for constructing an optimized vertical profile on the lateral and vertical trajectory and giving the estimations of distance, time, altitude, speed, fuel and wind notably on each point, at each change of piloting parameter and at destination, which will be displayed to the crew. The functions forming the subject of the present invention affect this part of the computer;

Guidance (GUID) 107, for guiding in the lateral and vertical planes the aircraft on its three-dimensional trajectory, while optimizing its speed, with the aid of the information computed by the Predictions function 106. In an aircraft equipped with an automatic piloting device 110, the latter can exchange information with the guidance module 107;

Digital data link (DATALINK) 108 for exchanging flight information between the Flight plan/Predictions functions and the control centres or other aircraft 109.

Figure 2:
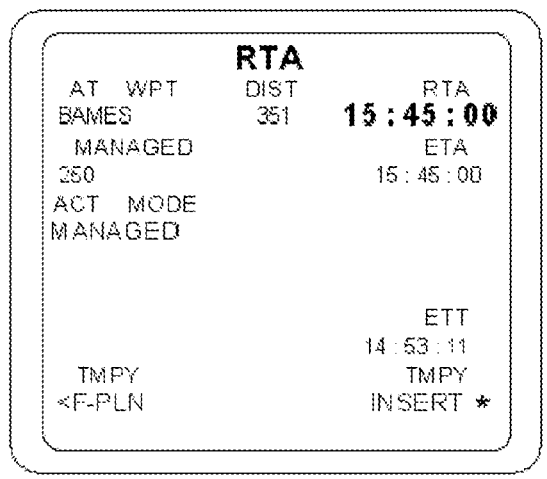

FIG. 2 presents an exemplary display of information relating to a waypoint, by a device of known FMS type.

In a typical manner, the viewing and the inputting of data relating to a determined waypoint are carried out by way of a dedicated display page, such as illustrated by FIG. 2.

Such a page presents notably the identification of the waypoint, dubbed "BAMES" in the example illustrated by the figure, the time constraint "RTA" input, 15 h 45 in the example illustrated by the figure, the predicted time "ETA" of arrival at the waypoint considered, 15 h 45 in the example illustrated by the figure, corresponding to a situation in which the speed strategy adopted makes it possible to converge to the time constraint input, as well as the takeoff time, designated by the acronym "ETT" corresponding to the conventional terminology "Estimated Take-off Time": 14 h 53 min 11 s in the example illustrated by FIG. 2.

As is described above, on the basis of such a display, the operator, for example the pilot, can input and view only temporal information specific to a single waypoint, without being able to view the information relating to the other waypoints of the flight plan.

Figure 3:
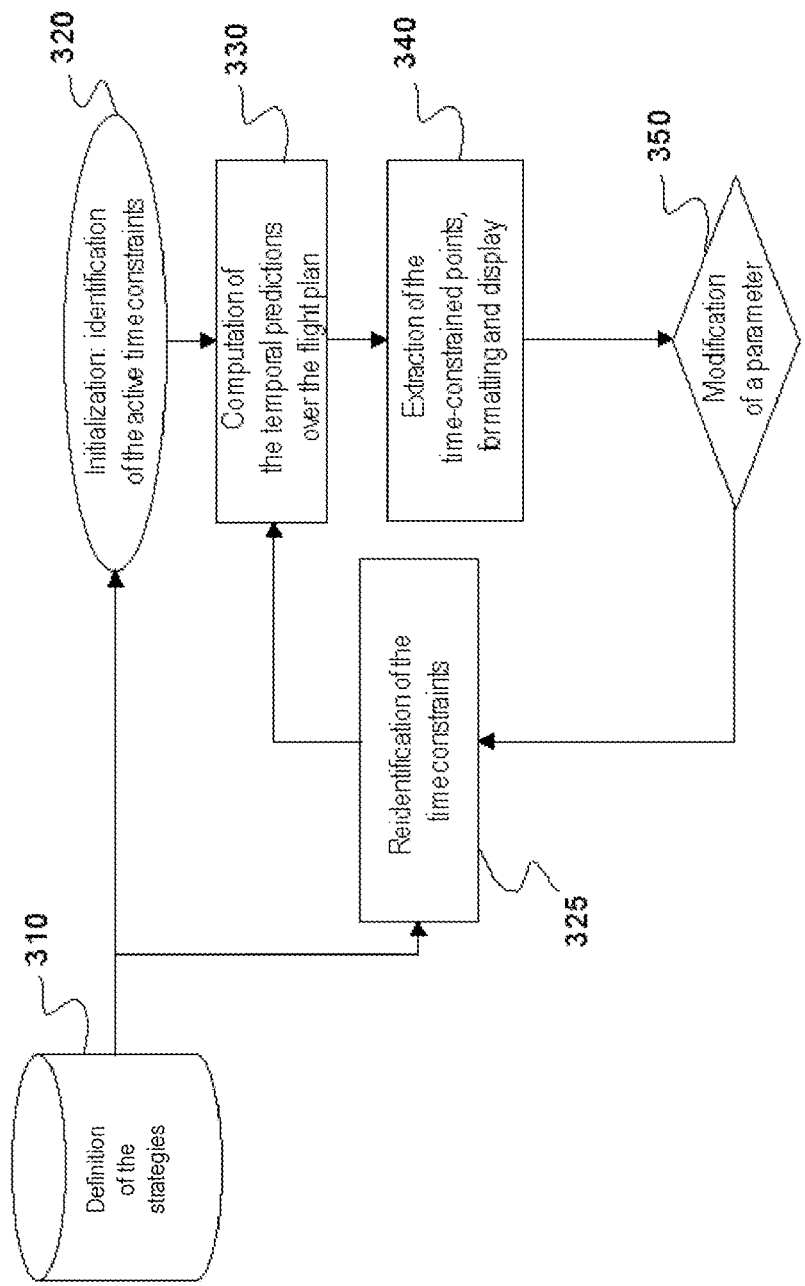

FIG. 3 presents a logic diagram illustrating a method of flight management, in an exemplary embodiment of the present invention.

A method of flight management can comprise a prior step 310 of defining the strategies.

The step of defining the strategies 310 makes it possible to define the strategies chosen so as to slave the flight of the aircraft in such a way that the time constraints are complied with. It thus makes it possible to define the relations between the elements of the points constrained in time, for example the relations between the minimum and maximum temporal bounds and the target time. It also makes it possible to define the type of convergence sought.

The step of defining the strategies 310 also makes it possible to initialize the method of flight management, by defining a default strategy.

For example, the strategy can be chosen from among:
a first strategy with respect to each time constraint, consisting for example in centring the target time in the middle of the minimum and maximum bounds for a constraint of time window type, commonly designated by the term "WINDOW", that is to say for which the aircraft must pass a waypoint at a temporal instant lying between two limit values defining a time window, in placing the target time on its minimum bound for a constraint of "AT OR AFTER" type, that is to say for which the aircraft must pass a waypoint after a determined instant, or on its maximum bound for a constraint of "AT OR BEFORE" type, that is to say for which the aircraft must pass a waypoint before a determined instant;
a second strategy of considering the set of constraints, for example:
 a strategy complying with and monitoring the time constraints in the order of the waypoints ahead of the aircraft, the resolution of a constraint n+1 starting from the timetable established on the previous constraint n,
 a strategy minimizing the time errors over the set of constraints, for example by calculating a quadratic mean of the errors,
 a so-called "backward" strategy, giving priority to the satisfaction of the last constraint, and then the satisfaction of the previous constraint and so on and so forth until the first constraint ahead of the aircraft. Such a strategy is more particularly adapted to the landing constraints or timeslots, commonly designated according to the term "slots", these constraints often being related to the crowding and to the capacities of the airport and to the connection requirements.

The step of defining the strategies 310 can also make it possible to customize the computation and/or display options, such as for example:
permit more than one active time constraint,
recentre the predicted time on the target time so as to compute the possible minimum and maximum bounds of the future constrained waypoints,
centre the time scales around the minimum and maximum bounds achievable,
choose an absolute time scale, for example based on Coordinated Universal Time, commonly designated by the initials "UTC", or else a relative scale with respect to the aeroplane, for example based on the estimated time elapsed, commonly designated by the initials "ETE",
the value of the weather uncertainty, essentially wind and temperature, expressed in the form of a wind speed equivalent to the quadratic mean of the mean wind error and of the mean temperature error, customarily expressed in knots, typically with a default value of 15 knots.

The various aforementioned strategies are indicated by way of nonlimiting examples of the present invention, a flight management device being able to adopt other strategies in accordance with its inherent specifications.

The prior step of defining the strategies 310 can be rooted on a flight management device, for example with a determined strategy chosen by the constructor, or else modifiable by an operator, typically the pilot. In the latter case, the display means of the device can for example be configured to display a page for defining the strategies, presenting the various possible strategies and allowing the operator to select via the input means.

The strategies chosen during the step of defining the strategies are then applied during the following steps, described hereinafter, of the method of flight management:
a step of identifying the time constraints 320, during which the attributes of each time-constrained waypoint are determined. An attribute comprises for example the active or inactive character of a time constraint, a time constraint being active if the flight of the aircraft is slaved to this time constraint, the slaving commands being determined during a step, described hereinafter, of computing the temporal predictions 330. The attributes can be dictated by the strategies defined in the previously described step of defining the strategies 310;

a step of computing the temporal predictions 330 over the flight plan. Computation algorithms known per se from the prior art can be implemented during the step of computing the temporal predictions 330, allowing the aircraft to converge to the active constraints. Such algorithms are for example described in the patent applications published respectively under the references FR0806232, FR0900719, FR0900832, FR 0902613, FR 0806621, from the same applicant as the present patent application. On completion of the computations implemented during the step of computing the temporal predictions 330, it is possible to gather, for each waypoint of the flight plan, and more particularly for each time-constrained waypoint, the corresponding predicted arrival time, as well as the minimum and maximum times achievable on this waypoint. According to a specific feature of the present invention, it is proposed that all this information be displayed by the display means, simultaneously for a plurality of waypoints: for example for all the waypoints, or else some of them such as the set of time-constrained waypoints alone. The display modalities can be implemented during a formatting and displaying step 340 described hereinafter. Examples of displays are described in detail hereinafter, with reference to FIGS. 4A and 4B;

a formatting and displaying step 340. This step can for example be implemented by the computation means. According to the present invention, it is proposed to group together a plurality of waypoints, for example the set of time-constrained waypoints, on one and the same graphical representation. To this end, the flight plan can be traversed, and the time-constrained waypoints logged, together with the associated information, this being notably:

the minimum and maximum possible arrival times at the waypoint, the minimum and maximum times termed "reliable", that is to say with consideration of a margin corresponding to the probable inaccuracies of the known weather model (taking into account the mean uncertainties in the forces and directions of the winds as well as the temperatures), the minimum and maximum bounds of the time constraint, and the target time, the predicted time;

a step of modifying a parameter 350, during which the operator can input, via the input means configured to this end, the modification of a parameter, for example the choice of a new waypoint for which the aircraft must be slaved to the time constraint. During the step of modifying a parameter 350, the operator can also for example activate or deactivate a constraint, for example by pressing a physical button, or a virtual button coinciding for example with the display of the target time corresponding thereto; the input means can also allow the operator to modify the minimum and/or maximum bounds of a time constraint, or else a target time at a given waypoint: the computation means can then be configured to recompute the minimum and maximum bounds so that the latter contain the modified target time, when the modification causes the target time to be displaced out of bounds. The computation means are configured to carry out a new computation of the temporal situations associated with the other constrained points which are affected by the modification;

a step of re-identifying the time constraints 325, for example, if the strategy determines that only one constraint may be active, and that a new active constraint is chosen during the step of modifying a parameter 350, that is to say a new waypoint whose associated time constraint is active, then a new active time constraint can be selected during the step of re-identifying the time constraints 325.

Figure 4A:
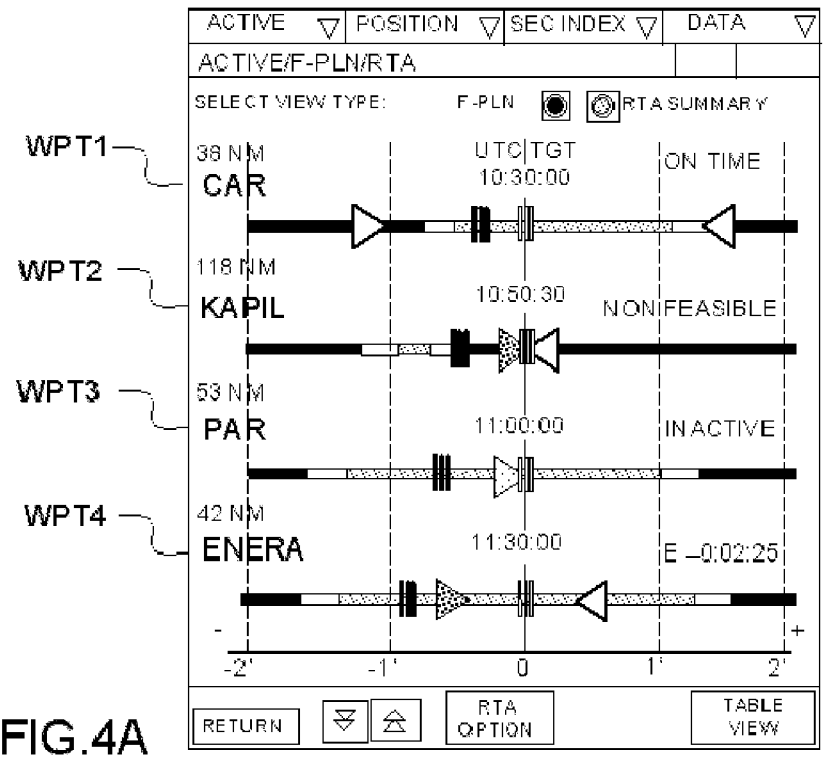
Figure 4B:
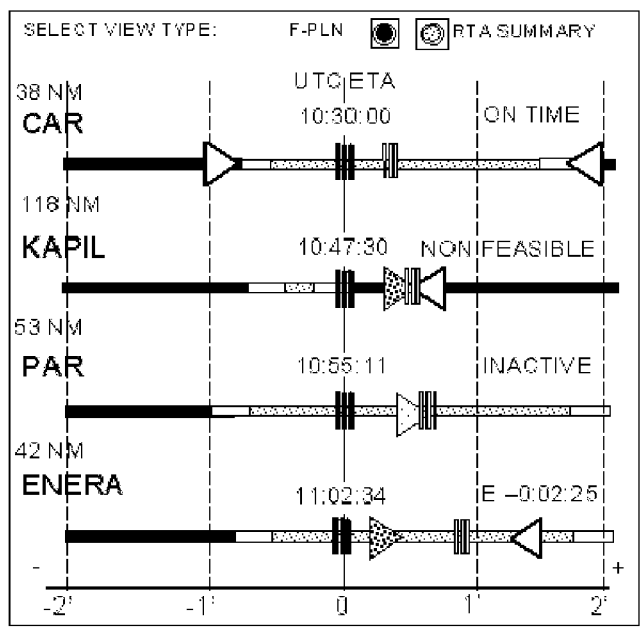

FIGS. 4A and 4B present examples of display of information relating to a plurality of waypoints, according to an exemplary embodiment of the invention.

In each of FIGS. 4A and 4B is presented a summary of the temporal situations specific to for example four waypoints WPT1, WPT2, WPT3 and WPT4, designated respectively "CAR", "KAPIL", "PAR" and "ENERA" in the example illustrated by the figures, and typically presented in association with the distance in Nm separating them from the previous waypoint of the flight plan. This summary can be designated "summary overview of the RTAs" or "RTA summary" according to the conventional terminology. For each of the waypoints considered in the nonlimiting example illustrated, and with which time constraints are associated, it is possible to display a timeline. In the example illustrated by the figures, the timelines relating to the four waypoints are presented from top to bottom of the display, in the order of appearance of the waypoints during the progress of the flight plan. On each line, the minimum and maximum possible bounds (the minimum bound corresponding to the constraint of earliest arrival at the waypoint considered, and the maximum bound to the constraint of latest arrival) can be particularized. The particularization can for example be represented through the use of different display colours: for example, the exteriors of the minimum and maximum bounds, that is to say the times of transit at the waypoint that are considered unachievable in practice can be represented coloured red (black in the figure), and the intervals situated between these bounds, that is to say covering the transit times at the waypoint that are considered achievable, can be represented coloured green (half-tone white in the figure).

The predicted transit time at a waypoint or estimated transit time, or ETA, can be represented on a timeline by an appropriate symbol. The former is necessarily situated between the aforementioned minimum and maximum bounds. In the example illustrated by FIGS. 4A and 4B, the symbol representing the predicted time can be formed by three aligned parallel vertical straight line segments, for example coloured green.

On each timeline associated with each waypoint WPT1, WPT2, WPT3, WPT4, . . . can also be represented the associated time constraint. The time constraint associated with a timeline can for example be represented by the minimum and maximum bounds of the latter, the minimum bound being able for example to be represented by a triangular arrow pointing towards the right, and the maximum bound by a triangular arrow pointing towards the left. The two bounds can be co-located when the time constraint is of "AT" type, that is to say when the aircraft is required to transit past the waypoint at a determined time, as is the case for the second waypoint WPT2 in the example illustrated by FIGS. 4A and 4B. Also, just one of the two bounds may be represented: for example the minimum bound only when the time constraint is of "AT OR AFTER" type as is the case for the third waypoint WPT3 in the example illustrated by FIGS. 4A and 4B, or else the maximum bound only when the time constraint is of "AT OR BEFORE" type. In the example illustrated by FIGS. 4A and 4B, time constraints of "WINDOW" type are associated with the first and fourth waypoints WPT1, WPT4.

On each timeline associated with each waypoint WPT1, WPT2, WPT3, WPT4, . . . it is also possible to represent the target time, representing the value to which the flight of the aircraft is slaved (typically: to which the aircraft's speed profile is slaved). In the example illustrated by FIGS. 4A and 4B, the target time is represented also by a triple vertical dash, in the manner of the predicted time. For differentiation purposes, another colour may be used for the display of the target time such as for example yellow.

In the example illustrated by FIGS. 4A and 4B, for an "AT" constraint such as that which applies to the second waypoint WPT2, the target time is placed at the constraint time, that is to say co-located with the minimum and maximum bounds of the time constraint.

In the example illustrated by FIGS. 4A and 4B, a strategy has been chosen, during the step of defining the strategies 310, with reference to FIG. 3 described previously, as regards the time constraints of "AT OR AFTER" or "AT OR BEFORE" type, consisting in initially placing the target time at the same level as the minimum or maximum bound of the time constraint, respectively. This is a nonlimiting exemplary strategy of the present invention.

Also in the example illustrated by FIGS. 4A and 4B, the strategy chosen as regards the time constraints of "WINDOW" type consists in initially placing the target time in the middle of the minimum and maximum bounds of the time constraint.

Advantageously, the active and inactive time constraints can be particularized. For example, the active constraints able to be satisfied can be represented in a first determined colour, for example yellow, the active constraints unable to be satisfied can be represented in a second determined colour, for example amber, and the inactive constraints can be represented in a third determined colour, for example white.

For the purposes of better readability, as illustrated in FIGS. 4A and 4B, the value of the target time can be explicitly mentioned in a dedicated box placed above the symbol representing said value.

Advantageously, as appears in the example illustrated by FIG. 4A, the time scales can be centred around the target times, the centring being able to be carried out during the formatting and displaying step 340 described previously with reference to FIG. 3.

In an alternative exemplary embodiment illustrated by FIG. 4B, the time scales can be centred around the estimated times of arrival at the waypoints.

It is of course possible to choose any other type of centring.

Advantageously still, it is possible to explicitly display the numerical values of other temporal parameters (for example the minimum and maximum bounds, the possible minimum and maximum times, the predicted arrival time, the difference between the predicted arrival time and the desired time, etc.), as a function of the specific features of the display means and of the operational needs.

For example, if the display means allow only the display of a limited number of text characters, the information relating to the temporal situations of the various waypoints can be displayed in an alternative manner, such as illustrated in FIGS. 5A and 5B described hereinafter, and presented by way of nonlimiting example of the present invention.

The information set can for example be displayed via two pages illustrated respectively by FIGS. 5A and 5B. The display means can thus be configured to display on a first page, illustrated by FIG. 5A, for example entitled "RTA FEASIBILITY", the achievable minimum and maximum bounds.

The display means can also be configured to display on a second page, illustrated by FIG. 5B, the information relating to the lower and upper bounds of the RTA constraints input by the operator for the various waypoints, the second page being able for example to be entitled "RTA EDIT". The two pages can for example be displayed alternately via a pressing of the operator on real or virtual buttons of "next" and "previous" type.

With reference to FIG. 5A, the first page can present by lines, for each waypoint WPT1, WPT2, WPT3, WPT4, WPT5, . . . designated by its abbreviation, in addition to the typical information regarding route, heading and distance to the next waypoint or from the previous waypoint, what are the time-achievable minimum and maximum bounds, this information being in the example illustrated by FIG. 5A presented on two columns entitled "ETAmin" and "ETAmax", as well as the predicted time of transit at the waypoints considered, on a column entitled "ETA".

Now with reference to FIG. 5B, the second page can present by lines, for each waypoint WPT1, WPT2, WPT3, WPT4, WPT5, . . . in addition to the typical information regarding route, heading and distance to the next waypoint following or from the previous waypoint in the flight plan, what are the bounds of the time constraints when a time constraint is defined for the waypoint in question, this information being able to be presented on two columns entitled "RTAinf" and "RTAsup", as well as the predicted time of transit at the waypoints considered, on a column entitled "ETA".

In a manner similar to the manner described previously with reference to FIGS. 4A and 4B, the use of colours can advantageously make it possible to particularize the potentially feasible or infeasible time constraints.

An appropriate character can advantageously make it possible to differentiate an achievable time constraint, as is the case in the example illustrated by FIG. 5B as regards the fifth waypoint WPT5.

Advantageously, a page can be displayed in a compact form termed "folded", in which for example only the waypoints with which time constraints are associated are presented, as well as for example the distance separating them, and in an exhaustive form termed "unfolded", in which for example all the waypoints of the flight plan and the information associated therewith are presented.

Advantageously, the input means can for example allow the operator to select a line, and to switch the display of the values of the line, in such a manner that the column in which the time predictions (ETAs) are displayed displays on request values that may for example be values stored during the last modification of the lateral or vertical flight plan or else reference values which are predetermined, for example by the airline in charge of operating the aircraft. The switching can for example be done by pressing a real or virtual button, such as the virtual button "ETAREF" in the example illustrated by FIGS. 5A and 5B.

Figure 6:
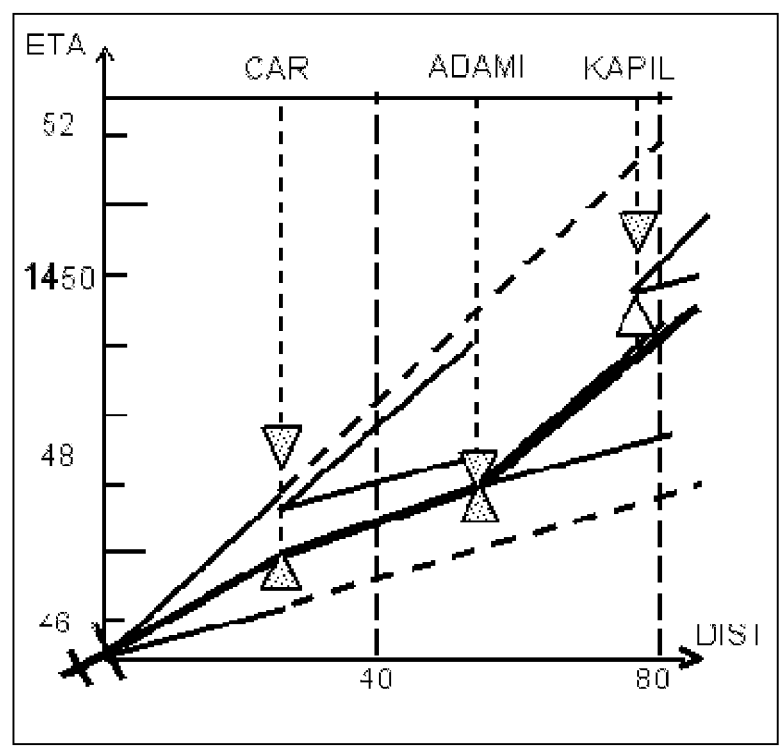
FIG. 6, an exemplary display of information relating to a plurality of waypoints, according to another exemplary embodiment of the invention.

Advantageously, the display means can be configured to present the various waypoints in a frame of reference in which the distances from the aircraft are plotted as abscissa, and the transit times are plotted as ordinate, a graphical representation such as this being describable as a "time-distance" representation. Such a representation makes it possible to present the result of the computation logic which has made it possible to reach this result, this computation logic being able for example to be such as described in the aforementioned patent FR 0902613. An advantage of the time-distance display is that it allows the operator to view and compare rapidly and in an intuitive manner the relative evolution of the speed from one time constraint to another as well as with respect to the minimum and maximum speeds varying from segment to segment, the slope of these graphs according to a normed distance abscissa being indicative of the speed. This type of display makes it possible furthermore to very intuitively recall the strategy which was chosen previously, like, as in the illustrated example, the strategy consisting in reinitializing the minimum and maximum times with each time constraint transit through the middle for a time constraint of "window" type. Finally, this display can recall by the colour employed for each symbol the character, satisfied or non-satisfied, of each of the constraints. Furthermore, the distance spread will by default be the same as the distance spread selected for the horizontal display of the trajectory or Navigation Display screen. An exemplary display of this type is illustrated by FIG. 6.

Advantageously, the input means can allow the operator to select a mode of information display, for example according to one of the modes described previously.

An advantage of the present invention is that it allows an overall summary display covering a plurality of waypoints of the flight plan, or indeed the entirety of them, while allowing easy and immediate viewing of the feasibility of the various time constraints displayed, as well as the evolution between each time constraint, and affording the operator the possibility of modifying parameters specific to a waypoint while instantaneously viewing the impacts of the modification on the resilience of the other time constraints imposed on the other waypoints of the flight plan.

The present invention can be implemented in a flight management device of FMS type, but can also be implemented in flight management devices of aircraft placed on the ground, in air traffic control systems, or flight management systems of airlines.

The invention claimed is:

1. A flight management device for an aircraft, the flight management device comprising:
    a display configured to display, to an operator, information relating to a plurality of waypoints of a flight plan;
    a processor in electrical communication with the display;
    an input in electrical communication with the processor and configured to receive temporal flight constraints from the operator, wherein a temporal situation of the aircraft is defined by at least:
        an estimated target time of transit at each waypoint,
        estimated minimum and maximum times, determined by the processor, of arrival at each waypoint,
        minimum or maximum temporal flight constraints at each waypoint having a temporal flight constraint, and
        an estimated time of transit, determined by the processor, at each waypoint; and
    a storage device in electrical communication with the processor and configured to store a database comprising a plurality of predefined strategies for convergence of flight predictions of the aircraft to one or more of the temporal flight constraints, each of the predefined strategies being based on the one or more of the temporal flight constraints along the flight plan and an order of the one or more of the temporal flight constraints along the flight plan, wherein:
    the input is further configured to operate a selection or a modification of the temporal flight constraints relating to a waypoint, and is further configured to receive, from the operator, a selection or modification of one or more of the predefined strategies,
    the processor is further configured to determine the temporal situation of the aircraft relating to other waypoints in response to selection or modification of the temporal flight constraints relating to the waypoint, and is further configured to apply the selected one or more of the predefined strategies,
    the display is further configured to display the plurality of the predefined strategies, and is further configured to simultaneously display the temporal situation of the aircraft in relation to the plurality of waypoints of the flight plan, and
    the display is further configured to simultaneously display a plurality of timelines corresponding to the plurality of waypoints, each timeline comprising a particularization of at least the estimated target time of transit of the aircraft, a predicted time of transit of the aircraft, and the estimated minimum and maximum times of arrival at the corresponding waypoint,
    wherein the display is further configured to display the plurality of timelines as a plurality of vertically separate timelines;
    wherein the display is further configured to display the plurality of timelines vertically sequentially from top to bottom according to the flight plan; and
    wherein the display is further configured to display the plurality of timelines in parallel.

2. The flight management device of claim 1, wherein the display is further configured to particularize an active or inactive character of a temporal flight constraint, the temporal flight constraint being active if flight of the aircraft is slaved to the temporal flight constraint.

3. The flight management device of claim 1, wherein the input is further configured to allow simultaneous modification or display of one or more temporal flight constraints of one or more chosen waypoints.

4. The flight management device of claim 1, wherein a temporal flight constraint associated with a waypoint is of AT type where the aircraft must reach the waypoint at a determined instant, AT OR BEFORE type where the aircraft must reach the waypoint up to the determined instant, AT OR AFTER type where the aircraft must reach the waypoint onwards of the determined instant, or WINDOW type where the aircraft must reach the waypoint during a time window included between two determined instants.

5. A method of flight management of an aircraft along a flight plan comprising a plurality of waypoints, the method comprising:
    defining a plurality of predefined strategies for convergence of flight predictions of the aircraft to one or more temporal flight constraints, each of the predefined strategies being based on a selection of the one or more temporal flight constraints along the flight plan and an order of the one or more temporal flight constraints along the flight plan;
    displaying, to an operator, the plurality of the predefined strategies;
    receiving, from the operator, a selection or a modification of one or more of the predefined strategies;
    computing temporal predictions of a temporal situation of the aircraft for each waypoint of the flight plan by applying the selected or modified one or more of the predefined strategies, the temporal situation of the aircraft being defined by at least:
        an estimated target time of transit at each waypoint, estimated minimum and maximum times of arrival at each waypoint, minimum or maximum temporal flight constraints at each waypoint having a temporal flight constraint, and an estimated time of transit at the waypoint;

formatting and displaying simultaneously a plurality of timelines corresponding to the plurality of waypoints, each timeline comprising a particularization of at least the estimated target time of transit to each waypoint, a predicted time of transit of the aircraft, and the estimated minimum and maximum times of arrival at the corresponding waypoint;

selecting and modifying parameters of the temporal flight constraints relating to a waypoint; and recomputing the temporal predictions of the temporal situation of the aircraft for each waypoint, wherein the formatting and displaying further includes displaying the plurality of timelines as a plurality of vertically separate timelines;

wherein the formatting and displaying further includes displaying the plurality of timelines vertically sequentially from top to bottom according to the flight plan; and wherein the formatting and displaying further includes displaying the plurality of timelines in parallel.

6. The method of flight management of claim 5, wherein the formatting and displaying comprises particularizing an active or inactive character of a temporal flight constraint, the temporal flight constraint being active if flight of the aircraft is slaved to the temporal flight constraint.

7. The method of flight management of claim 5, wherein modifying a parameter allows simultaneous modification of a target time of a chosen waypoint associated with a temporal flight constraint.

8. The method of flight management of claim 5, wherein a temporal flight constraint associated with a waypoint is of AT type where the aircraft must reach the waypoint at a determined instant, AT OR BEFORE type where the aircraft must reach the waypoint up to the determined instant, AT OR AFTER type where the aircraft must reach the waypoint onwards of the determined instant, or WINDOW type where the aircraft must reach the waypoint during a time window included between two determined instants.

9. A flight management device for an aircraft, the flight management device comprising:

a display configured to display, to an operator, information relating to a plurality of waypoints of a flight plan;

a processor in electrical communication with the display;

an input in electrical communication with the processor and configured to receive temporal flight constraints from the operator, wherein a temporal situation of the aircraft is defined by at least:

an estimated target time of transit at each waypoint, estimated minimum and maximum times, determined by the processor, of arrival at each waypoint, minimum or maximum temporal flight constraints at each waypoint having a temporal flight constraint, and an estimated time of transit, determined by the processor, at each waypoint;

a storage device in electrical communication with the processor and configured to store a database comprising a plurality of predefined strategies for convergence of flight predictions of the aircraft to one or more of the temporal flight constraints, each of the predefined strategies being based on the one or more of the temporal flight constraints along the flight plan and an order of the one or more of the temporal flight constraints along the flight plan;

the input is further configured to operate a selection or a modification of the temporal flight constraints relating to a waypoint, and is further configured to receive, from the operator, a selection or modification of one or more of the predefined strategies;

the processor is further configured to determine the temporal situation of the aircraft relating to other waypoints in response to selection or modification of the temporal flight constraints relating to the waypoint, and is further configured to apply the selected one or more of the predefined strategies;

the display is further configured to display the plurality of the predefined strategies, and is further configured to simultaneously display the temporal situation of the aircraft in relation to the plurality of waypoints of the flight plan; and the display is further configured to simultaneously display a plurality of timelines corresponding to the plurality of waypoints, each timeline comprising a particularization of at least the estimated target time of transit of the aircraft, a predicted time of transit of the aircraft, and the estimated minimum and maximum times of arrival at the corresponding waypoint, wherein the display is further configured to display the plurality of timelines as a plurality of vertically separate timelines;

wherein the display is further configured to display the plurality of timelines vertically sequentially from top to bottom according to the flight plan;

wherein the display is further configured to display the plurality of timelines in parallel;

wherein the input is further configured to allow simultaneous modification or display of one or more temporal flight constraints of one or more chosen waypoints; and wherein the display is further configured to display the plurality of timelines sequentially according to the flight plan.

* * * * *